Feb. 21, 1933. J. K. DIAMOND 1,898,035
LINK BELT
Filed Jan. 29, 1931

INVENTOR
James K. Diamond
BY
Chappell & Earl
ATTORNEYS

Patented Feb. 21, 1933

1,898,035

UNITED STATES PATENT OFFICE

JAMES K. DIAMOND, OF GRAND RAPIDS, MICHIGAN, ASSIGNOR TO CLIPPER BELT LACER COMPANY, OF GRAND RAPIDS, MICHIGAN, A CORPORATION OF MICHIGAN

LINK BELT

Application filed January 29, 1931. Serial No. 512,000.

The main object of this invention is to provide a link belt of the V type in which friction blocks or facing elements of suitable resilient material are very securely supported.

A further object is to provide a link belt of the V type which is capable of transmitting heavy loads and at the same time may be of comparatively light material and is very durable.

Objects pertaining to details and economies of my invention will definitely appear from the description to follow. The invention is defined in the claims.

A structure which embodies the features of my invention is clearly illustrated in the accompanying drawing, in which.

Figure 1:
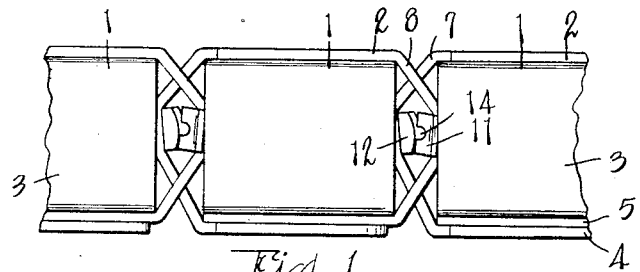
Fig. 1 is a fragmentary side elevation of my improved belt.
Figure 3:
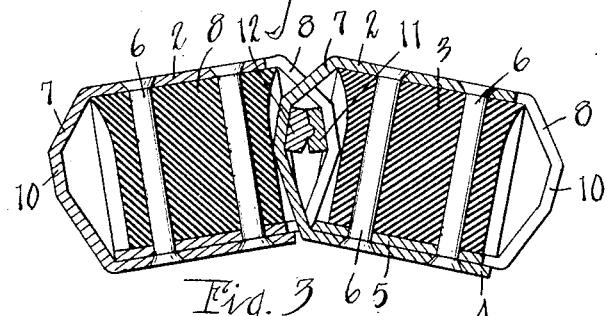
Fig. 3 is a longitudinal section of a pair of links in flexed position taken on a line corresponding to line 3—3 of Figs. 2, 4 and 5, the rivets for securing the body members to the facing blocks being shown in full lines.
Figure 4:
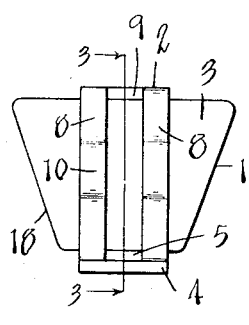
Fig. 4 is an end view of one of the links looking from the right of Fig. 3.
Figure 5:
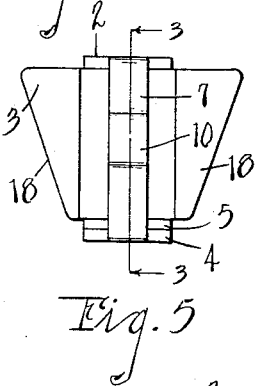
Fig. 5 is an end view of one of the links looking from the left of Fig. 3.
Figure 6:
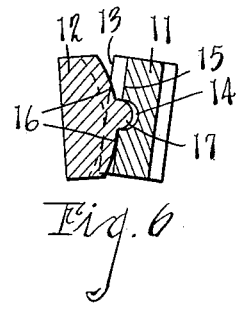
Fig. 6 is an enlarged transverse section of the coupling pin.
Figure 2:
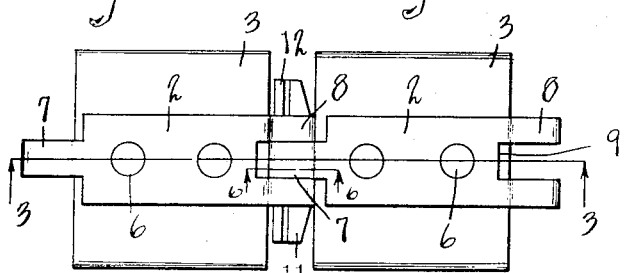
Fig. 2 is a plan or outside view of a pair of coacting links.
Figure 2:
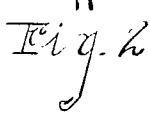

Referring to the drawing, 1 represents the links as a whole. Each link comprises a strap-like body portion 2 which is disposed to embrace and extend longitudinally of the facing blocks 3. These facing blocks are preferably of rubber composition.

In the embodiment illustrated the ends 4 and 5 of the body members are arranged in overlapped relation on the inner side of the facing blocks, the parts being secured together by the rivets 6. The ends of the body member are disposed to provide coupling loops 7 and 8, the body member being slotted at 9 to provide a pair of coupling loops 8 suitably spaced to receive a coupling loop 7 between them.

The sides of the coupling loops converge inwardly and the bight portions 10 thereof are preferably straight.

The coupling pin is formed of a pair of coacting members 11 and 12, the member 11 having a flat face 13 with a longitudinal groove 14 therein and also a transverse recess 15. The bottom of this recess is flat and disposed in a plane parallel to the main face of the member. The pin member 12 has a curved bearing face 16 coacting with the flat bearing face of the member 11 and in rocking engagement therewith, the face 16 having a raised central portion coacting with the bottom of the recess 15. The member 12 also has a longitudinal tongue 17 coacting with the groove 14.

The members are thus supported against relative longitudinal and transverse sliding movement. The pin members 11 and 12, being supported to rock or swing with the links, rock upon each other so that there is no bearing relation between them. These pin features are made the subject matter of claims in a copending application filed concurrently herewith.

Belts embodying my improvements are capable of transmitting heavy loads and are very durable, the facing members only coming in contact with the pulley, the faces 18 of the facing member being converged at the proper angle to coact with a V pulley.

Having thus described my invention what I claim as new and desire to secure by Letters Patent is:

1. In a link belt, the combination of a plurality of coacting links comprising block-like facing members of resilient material having inwardly converging faces, strap-like body members disposed about said facing members with their ends in overlapping relation and secured to said facing members by rivets arranged therethrough and through the overlapping ends of said body members, the ends of said body members being extended beyond said facing members to provide coupling loops, said coupling loops having converging arms and flat bight portions, one of said coupling loops being slotted to receive the coupling loop of an adjacent link, and coupling pins, each comprising a pair of coacting members in supporting engagement with the straight bight portions of said loops to swing therewith, said coupling members having rocking engagement and being provided with co-engaging parts whereby they are supported against relative lateral and longitudinal sliding movement upon each other.

2. In a link belt, the combination of a plurality of coacting links comprising block-like facing members, strap-like body members disposed about said facing members with their ends in overlapping relation and secured to said facing members by rivets arranged therethrough and through the overlapping ends of said body members, the ends of said body members being extended beyond said facing members to provide coupling loops, and coupling pins each comprising a pair of coacting members in supporting engagement with said loops to swing therewith, said coupling members having rocking engagement and being provided with co-engaging parts whereby they are supported against relative lateral and longitudinal sliding movement upon each other.

3. In a link belt, the combination of a plurality of coacting links comprising block-like facing members of resilient material having inwardly converging faces, strap-like body members disposed about said facing members and secured thereto, the ends of said body members being extended beyond said facing members to provide coupling loops, said coupling loops having converging arms and flat bight portions, one of said coupling loops being slotted to receive the coupling loop of an adjacent link, and coupling pins, each comprising a pair of coacting members in supporting engagement with the straight bight portions of said loops to swing therewith, said coupling members having rocking engagement and being provided with co-engaging parts whereby they are supported against relative lateral and longitudinal sliding movement upon each other.

4. In a link belt, the combination of a plurality of coacting links comprising block-like facing members of resilient material, strap-like body members disposed about said facing members and secured thereto, the ends of said body members being extended beyond said facing members to provide coupling loops, said coupling loops having converging arms and flat bight portions, one of said coupling loops being slotted to receive the coupling loop of an adjacent link, and coupling pins, each comprising a pair of coacting members in supporting engagement with the straight bight portions of said loops to swing therewith, said coupling members having rocking engagement and being provided with co-engaging parts whereby they are supported against relative lateral and longitudinal sliding movement upon each other.

5. In a link belt, the combination of a plurality of coacting links comprising block-like facing members of resilient material having inwardly converging faces, strap-like body members disposed about said facing members and secured thereto, the ends of said body members being extended beyond said facing members to provide coupling loops, one of said coupling loops being slotted to receive the coupling loop of an adjacent link, and coupling pins for said loops, said coupling members having rocking engagement and being provided with co-engaging parts whereby they are supported against relative lateral and longitudinal sliding movement upon each other.

6. In a link belt, the combination of a plurality of coacting links comprising block-like facing members of resilient material having inwardly converging faces, loop-like body members disposed about the outside of said facing members and secured thereto, the ends of said body members being extended beyond said facing members to provide coupling loops, said coupling loops having converging arms and flat bight portions, and coupling pins, each comprising a pair of coacting members in supporting engagement with the straight bight portions of said loops to swing therewith, said coupling members having rocking engagement and being provided with co-engaging parts whereby they are supported against relative lateral and longitudinal sliding movement upon each other.

In witness whereof I have hereunto set my hand.

JAMES K. DIAMOND.